United States Patent
Chang

(10) Patent No.: US 11,868,112 B2
(45) Date of Patent: Jan. 9, 2024

(54) MULTI-POINT MEASUREMENT SYSTEM AND METHOD THEREOF

(71) Applicant: Smart Tag Inc., Taipei (TW)

(72) Inventor: Kun-Chieh Chang, Taipei (TW)

(73) Assignee: SMART TAG INC., Taipei (TW)

( * ) Notice: Subject to any disclaimer, the term of this patent is extended or adjusted under 35 U.S.C. 154(b) by 132 days.

(21) Appl. No.: 17/535,736

(22) Filed: Nov. 26, 2021

(65) Prior Publication Data

US 2022/0171358 A1   Jun. 2, 2022

(30) Foreign Application Priority Data

Nov. 30, 2020   (TW) ................................ 109142120

(51) Int. Cl.
*G05B 19/042* (2006.01)

(52) U.S. Cl.
CPC ..... *G05B 19/0425* (2013.01); *G05B 19/0421* (2013.01); *G05B 2219/24204* (2013.01); *G05B 2219/34465* (2013.01)

(58) Field of Classification Search
None
See application file for complete search history.

(56) References Cited

U.S. PATENT DOCUMENTS 10,628,639 B1   4/2020   Lai et al.
11,405,011 B2 *  8/2022   Lee .................... G06K 19/0723
(Continued)

FOREIGN PATENT DOCUMENTS

TW   M575133 U    3/2019
TW   202020744 A  6/2020
(Continued)

OTHER PUBLICATIONS

TW Office Action dated Feb. 23, 2022 in Taiwan application No. 109142120.

*Primary Examiner* — Jason Lin
(74) *Attorney, Agent, or Firm* — McClure, Qualey & Rodack, LLP

(57) ABSTRACT

A multi-point measurement system and a multi-point measurement method are provided. The multi-point measurement system is for measuring a device under testing and comprises a plurality of sensors and a computing device. The sensors are respectively attached to a plurality of measuring points of the device under testing. The computing device comprises a computing unit and a storage unit; the computing unit comprises a learning module, and the computing device establishes communication connections to the sensors respectively. The sensors generate original sensing data and transmit them to the storage unit for storage. The computing unit inputs processed sensing data obtained by preprocessing the original sensing data into the learning module for data analysis, and obtains a plurality of reference values corresponding to the sensors respectively. At least two adjacent sensors form a group; the computing unit sequentially inputs the processed sensing data corresponding to the sensors in the group into the learning module for a merge operation, and obtains a plurality of merged reference values corresponding to the groups respectively. The computing unit performs a determination operation using the merged reference values corresponding to each group and the reference values corresponding to the sensors in the group and generates a suitability determination for the measuring points.

18 Claims, 4 Drawing Sheets

(56) References Cited

U.S. PATENT DOCUMENTS

| | | | |
|---|---|---|---|
| 2006/0044115 A1* | 3/2006 | Doi | G06K 19/0723 |
| | | | 340/572.1 |
| 2006/0220790 A1* | 10/2006 | Doi | G06K 7/10019 |
| | | | 340/10.2 |
| 2011/0131375 A1* | 6/2011 | Noeldner | G06F 13/1673 |
| | | | 711/E12.001 |
| 2013/0110794 A1* | 5/2013 | Lee | G06F 16/215 |
| | | | 707/E17.002 |
| 2016/0011996 A1* | 1/2016 | Asaad | G06F 9/3885 |
| | | | 710/308 |
| 2017/0316235 A1* | 11/2017 | Lee | G06K 7/10366 |
| 2019/0182049 A1* | 6/2019 | Juels | H04L 9/3247 |
| 2020/0104639 A1 | 4/2020 | Didari et al. | |
| 2020/0264335 A1 | 8/2020 | Bhatia et al. | |
| 2020/0342272 A1* | 10/2020 | Lin | G06F 18/24147 |

FOREIGN PATENT DOCUMENTS

| | | |
|---|---|---|
| TW | 202036357 A | 10/2020 |
| TW | 202040500 A | 11/2020 |

\* cited by examiner

P1: T(25, 28, 27…24, [IP])^Tag ; H(70, 65, 63…68, [IP])^Tag ;  
　　V(80, 78, 81…75, [IP]) Tag

P2: T(26, 25, 27…23, IP) ; H(71, 64, 65…67, IP) ;  
　　V(79, 76, 78…76, IP)

P3: T(25, 24, 28…26, IP) ; H(69, 67, 68…68, IP) ;  
　　V(78, 75, 76…74, IP)

FIG. 8

MULTI-POINT MEASUREMENT SYSTEM AND METHOD THEREOF

BACKGROUND OF THE INVENTION

1. Field of the Invention

The present disclosure relates to a multi-point measurement system and a multi-point measurement method. Specifically, the present disclosure relates to a multi-point measurement system and a multi-point measurement method for a machine device.

2. Description of the Prior Art

In the production process of manufacturers, how production machines can be monitored so that malfunctions may be repaired immediately to avoid negative impact to the normal operations of production lines, which in turn might affect product yields and production capacity, is a topic that concerns manufacturers.

Sensors are devices for detecting incidents or changes that occur in the environment (such as changes in location, length, height difference, displacement, appearance, and the like) and transmit the detected information to other electronic device(s). Depending on the type of sensor, data collected by a sensor may include physical measurements such as temperature, light, color, air pressure, magnetic force, speed, acceleration, and the like.

If sensors are used to monitor manufacturing devices, a plurality of sensors need to be disposed in a plurality of locations on the manufacturing device to monitor each physical measurement of the manufacturing device. Therefore, the locations of the sensors are very important. How to use the most effective way to find the most suitable location to dispose the sensors at the best measuring point of the device under test is an important task in the monitoring method using sensors.

SUMMARY OF THE INVENTION

The present disclosure intends to provide a multi-point measurement system. Through properties of the attachable sensors, the most suitable measuring points of the device under testing can be found by more effective ways.

The present disclosure further intends to provide a multi-point measurement method. Through data analysis, the most suitable measuring points of the device under testing can be found.

An embodiment of the present disclosure relates to a multi-point measurement system. The multi-point measurement system is provided for measuring a device under testing and includes a plurality of sensors and a computing device. The sensors are respectively attached to a plurality of measuring points of the device under testing. The computing device includes a computing unit and a storage unit. The computing unit includes a learning module and the computing unit respectively establishes communication connections to the sensors. The sensors are configured to generate original sensing data and transmit the original sensing data to the storage unit. The computing unit is configured to input processed sensing data, obtained by data preprocessing of the original sensing data, into the learning module for data analysis, and is configured to obtain a plurality of reference values corresponding to the sensors, respectively. The plurality of sensors form a plurality of groups; each group includes at least two adjacent sensors; for each group, the computing unit is configured to input the processed sensing data corresponding to the sensors in the group into the learning module for a merge operation, and is configured to obtain a plurality of merged reference values corresponding to the groups, respectively. The computing unit is configured to perform a determination operation using the merged reference values corresponding to each group and the reference values corresponding to the sensors in the group so as to generate a suitability determination for the measuring points.

Another embodiment of the present disclosure relates to a multi-point measurement method. The multi-point measurement method is for measuring the device under testing, and includes the steps of: generating a plurality of original sensing data using a plurality of sensors respectively attached to a plurality of measuring points of the device under testing and transmitting them to a storage unit of a computing device for storage, and the computing device respectively establishes communication connections to the sensors; inputting a plurality of processed sensing data obtained by data preprocessing of the original sensing data into a learning module of the computing unit using a computing unit of the computing device for data analysis, and obtaining a plurality of reference values respectively corresponding to the sensors; using at least two adjacent sensors to form a group, wherein the computing unit sequentially inputs the processed sensing data corresponding to the sensors in the group into the learning module so as to perform a merge operation and obtains a plurality of merged reference values corresponding to the groups, respectively; and performing a determination operation based on the merged reference values corresponding to each group and the reference values corresponding to the sensors in the group using the computing unit so as to generate a suitability determination for the measuring points.

BRIEF DESCRIPTION OF THE DRAWINGS

Descriptions of drawings of the present disclosure are as below:

FIG. 5 is a diagram of reference values illustrated according to an embodiment of the present disclosure;

FIG. 6 is a diagram of groups illustrated according to an embodiment of the present disclosure;

FIG. 7 is a diagram of a merged reference value illustrated according to an embodiment of the present disclosure;

FIG. 8 is a diagram of tagged sensing data illustrated according to an embodiment of the present disclosure;

DETAILED DESCRIPTION OF THE PREFERRED EMBODIMENT

Figure 1:
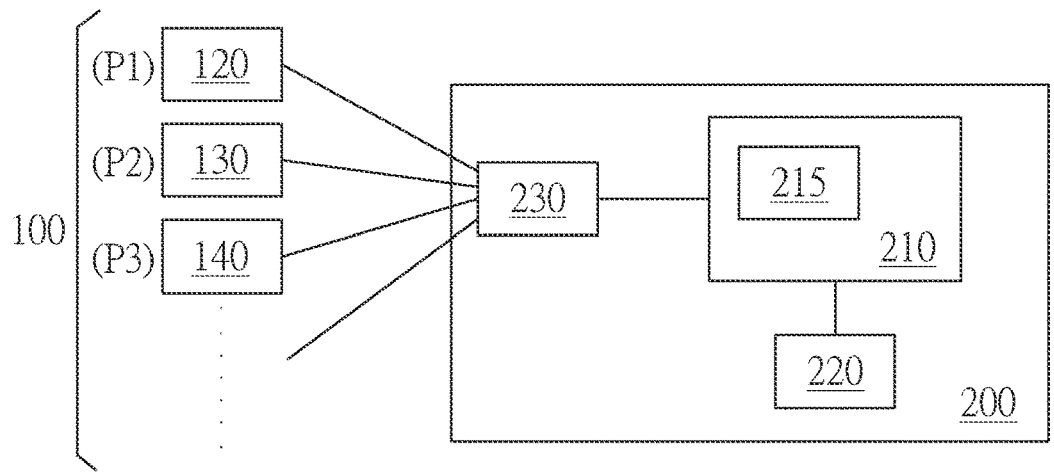
FIG. 1 is a diagram of a multi-point measurement system illustrated according to an embodiment of the present disclosure.
Figure 2:
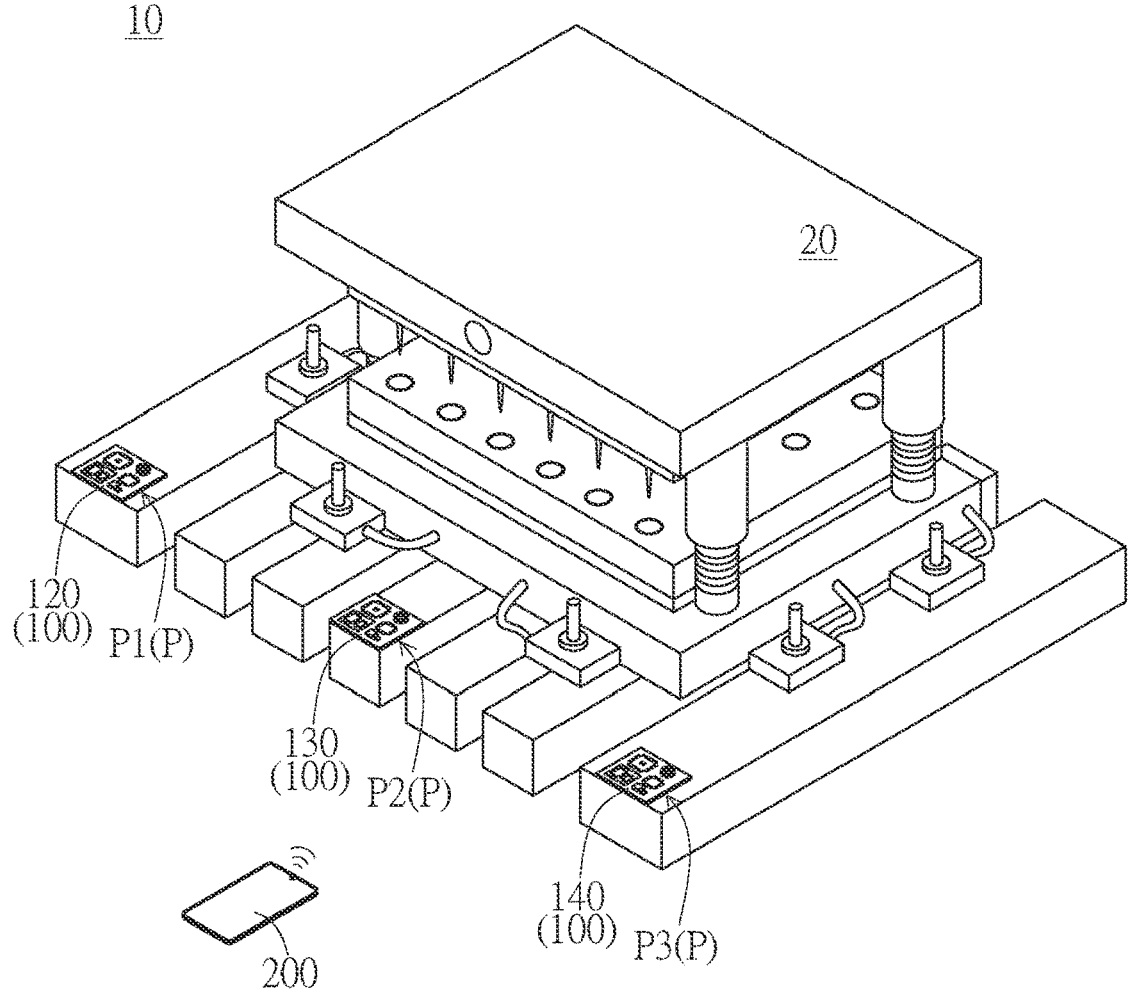
FIG. 2 is a diagram of a multi-point measurement scenario illustrated according to an embodiment of the present disclosure.

FIG. 1 is a diagram of a multi-point measurement system illustrated according to an embodiment of the present disclosure; FIG. 2 is a diagram of a multi-point measurement scenario illustrated according to an embodiment of the present disclosure. A multi-point measurement system 10 is provided for measuring a device 20 under testing and includes a plurality of sensors 100 and a computing device 200. The plurality of sensors 100 (such as a first sensor 120, a second sensor 130, a third sensor 140, and the like) are attached to a plurality of measuring points P (such as a first measuring point P1, a second measuring point P2, and a third measuring point P3 . . . ) of the device 20 under testing, respectively. In the embodiment of FIG. 1 and FIG. 2, the sensors 100 at least include the first sensor 120, the second sensor 130, and the third sensor 140. The measuring points P at least include the first measuring point P1, the second measuring point P2, and the third measuring point P3. In addition, the first sensor 120 is attached to the first measuring point P1, the second sensor 130 is attached to the second measuring points P2, and the third sensor 140 is attached to the third measuring point P3, but not limited thereto; that is, in another embodiment, the multi-point measurement system 10 may include three sensors 100 attached to different measuring points P, respectively.

In a preferred embodiment, the sensors 100 may be an adhesive, flexible, and thin wireless sensor which can be attached to a surface or the inner side of the device 20 under testing randomly and is configured to detect variations in parameters such as temperature, humidity, vibration, and the like of the device 20 under testing generated in the process of manufacturing, and transmit the collected data to a storage unit 220 at real time for storage, so that the data can be used for subsequent data analysis.

In a preferred embodiment, the device 20 under testing is a machine device in a production line. Through the multi-point measurement system and the multi-point measurement method of the present disclosure, the best measuring point for multi-point measurement on the surface or the inner side of the device 20 under testing can be found. Furthermore, a plurality of sensors 100 are adhered to a plurality of best measuring points on the surface or the inner side of the device 20 under testing and the sensors 100 collect various data generated by the device 20 under testing in the process of manufacturing for subsequent data analysis.

As illustrated in FIG. 1, the computing device 200 includes a computing unit 210, the storage unit 220, and a communication module 230. The computing unit 210 includes a learning module 215, and the computing device 200 establishes communication connections to the sensors 100 via the communication module 230, respectively. The sensors 100 generate original sensing data and transmits them to the storage unit 220 for storage.

In a preferred embodiment, the computing device 200 is a portable device such as a smart-phone. In another embodiment, the computing device 200 is a host computer of a local network. In a preferred embodiment, the computing unit 210 is a processor of the computing device 200, and the storage unit 220 is an internal storage or an external storage of the computing device 200.

The sensors 100 are temperature sensors, humidity sensors, vibration sensors, or a combination thereof. The original sensing data is temperature data, humidity data, vibration data, or a combination thereof. In a preferred embodiment, the sensors 100 are sensors with multiple functions, such as a combination of temperature and humidity sensors, a combination of temperature, humidity and vibration sensors, or other types of combination of sensors. In another embodiment, the sensors 100 are sensors with a single function such as temperature sensors, humidity sensors, vibration sensors, or other sensors only including a single function. The original sensing data is sensing data of a single type such as temperature data, humidity data, vibration data, or other sensing data obtained by corresponding functions.

Figures 3, 4:
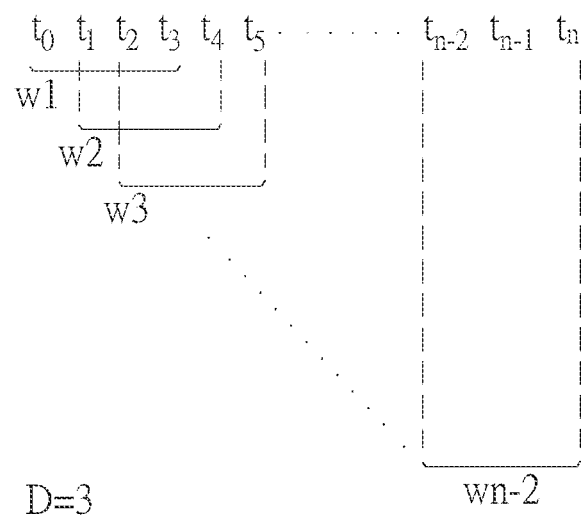
FIG. 3 is a diagram of original sensing data illustrated according to an embodiment of the present disclosure.
FIG. 4 is a diagram of time windows illustrated according to an embodiment of the present disclosure.

FIG. 3 is a diagram of the original sensing data illustrated according to an embodiment of the present disclosure. The sensors 100 of the embodiment illustrated in FIG. 3 may be complex sensors combining temperature sensors, humidity sensors, and vibration sensors; therefore, the original sensing data generated by the sensors 100 are complex original sensing data combining temperature data, humidity data, and vibration data; that is, the original sensing data include three types of sensing data such as temperature data, humidity data, and vibration data.

Take the embodiment of FIG. 3 for instance. The original sensing data generated through the measurement taken at the first measuring point P1 by the first sensor 110 attached to the first measuring point P1 is "P1:T (25, 28, 27 . . . 24); H (70, 65, 63 . . . 68); V (80, 78, 81 . . . 75)", wherein the temperature data T (unit: ° C.) is "25, 28, 27 . . . 24", the humidity data H (unit: %) is "70, 65, 63 . . . 68", and the vibration data V (unit: m/s$^2$) is "80, 78, 81 . . . 75"; the original sensing data generated through the measurement taken at the second measuring point P2 by the second sensor 120 attached to the second measuring point P2 is "P2:T (26, 25, 27 . . . 23); H (71, 64, 65 . . . 67); V (79, 76, 78 . . . 76)", wherein the temperature data T (unit: ° C.) is "26, 25, 27 . . . 23", the humidity data H (unit: %) is "71, 64, 65 . . . 67", and the vibration data V (unit: m/s$^2$) is "79, 76, 78 . . . 76"; the original sensing data generated through the measurement taken at the third measuring point P3 by the third sensor 130 attached to the third measuring point P3 is "P3:T (25, 24, 28 . . . 26); H (69, 67, 68 . . . 68); V (78, 75, 76 . . . 74)", wherein the temperature data T (unit: ° C.) is "25, 24, 28 . . . 26", the humidity data H (unit: %) is "69, 67, 68 . . . 68", and the vibration data V (unit: m/s$^2$) is "78, 75, 76 . . . 74".

Specifically, each of the original sensing data includes a plurality of original time sequence sensing data. Take the embodiment of FIG. 3 for instance. The original sensing data generated by the measurement at the first measuring point P1 is "P1:T (25, 28, 27 . . . 24); H (70, 65, 63 . . . 68); V (80, 78, 81 . . . 75)", wherein the original time sequence sensing data of the temperature data T is "25, 28, 27 . . . 24"; that is, the numerical value "25" is the first temperature data obtained at the first time point, the numerical value "28: is the second temperature data obtained at the second time point, the numerical value "27" is the third temperature data obtained at the third time point, . . . (and so on), . . . the numerical value "24" is the final temperature data obtained at the final time point.

The device 20 under testing has an operation period D; specifically, the operation period D is the period of the device 20 under testing being operated once. The original time sequence sensing data corresponds to a plurality of time windows W, respectively. In a preferred embodiment, the time unit of the time window W ranges from 1 to 10 times the operation period D. Regarding the time window W, please refer to FIG. 4 and the paragraphs corresponding to FIG. 4.

FIG. 4 is a diagram of the time window W illustrated according to an embodiment of the present disclosure. The time window W includes a first time window W1, a second time window W2, a third time window W3, . . . (and so on), and a final time window Wn-2. Time t includes a start time $t_0$, a first time $t_1$, a second time $t_2$, a third time $t_3$, a fourth time $t_4$, a fifth time $t_5$ . . . and a final time tn. In the embodiment illustrated in FIG. 4, the operation period D may be 3 seconds, for instance; that is, the operation of the device 20 under testing takes 3 seconds each time to complete. Therefore, the time unit of the time window W in the embodiment illustrated in FIG. 4 may range from 3 seconds to 30 seconds. Take 3 seconds as an example for the embodiment illustrated in FIG. 4. The start time $t_0$ in the embodiment illustrated in FIG. 4 is the $0^{th}$ second, the first time $t_1$ is the $1^{st}$ second, the second time $t_2$ is the $2^{nd}$ second, and the final time $t_n$ is the nth second. As illustrated in FIG. 4, the first time window W includes the start time $t_0$ to the third time t3, the second time window W2 includes the first time $t_1$ to the fourth time $t_4$, the third time window W3 includes the second time $t_2$ to the fifth time $t_5$ . . . and so on; that is, the first sensor 120 located at the first measuring point P1 in the embodiment of FIG. 3 generates the first temperature data to the fourth temperature data during the $0^{th}$ to the $3^{rd}$ seconds, generates the fifth temperature data to the eighth temperature data during the $1^{st}$ to the $4^{th}$ seconds, and generates the $9^{th}$ to the $12^{th}$ temperature during the $2^{nd}$ to the $5^{th}$ seconds, . . . (and so on).

FIG. 5 is a diagram of reference value of an embodiment of the present disclosure. The computing unit 210 in FIG. 1 is configured to input processed sensing data obtained by preprocessing the original sensing data of FIG. 3 into a learning module 215 for data analysis, and reference values B are obtained respectively corresponding to the sensors 100 located at the different measuring points P in FIG. 5 (take the first measuring point P1, the second measuring point P2, the third measuring point P3 for instance in FIG. 5). Take the embodiment of FIG. 5 for instance. The reference values B include a first reference value B1, a second reference value B2, a third reference value B3 corresponding to the first sensor 120 located at the first measuring point P1, the second sensor 130 located at the second measuring point P2, and the third sensor 140 located at the third measuring point P3, respectively.

Take the temperature data measured by the first sensor 120 located at the first measuring point P1 for instance. The computing unit 210 in FIG. 1 is configured to input the processed sensing data obtained by preprocessing the original temperature sensing data "25, 28, 27 . . . 24" measured by the first sensor 120 located at the first measuring point P1 in FIG. 3 into the learning module 215 in FIG. 1 for data analysis and obtains a reference value B of the first sensor 120 located at the first measuring point P (that is, the first reference value B1) of 92%. It also obtains in the same way a reference value B of the second sensor 130 located at the second measuring point P2 (that is, the second reference value B2) of 89% and a reference value B of the third sensor 140 located at the third measuring point P3 (that is, the third reference value B3) of 95%. Regarding the processed sensing data, please refer to FIG. 8 and the descriptions in the paragraphs corresponding to FIG. 8.

Furthermore, the plurality of sensors 100 form a plurality of groups 110, each group include at least two adjacent sensors 100. For each group 110, the computing unit 210 in FIG. 1 is configured to sequentially input the processed sensing data corresponding to the sensors 110 in the group 110 into the learning module 215 in FIG. 1 for a merge operation and obtain the merged reference values C corresponding to the groups 110, respectively. Regarding the groups 110, please refer to FIG. 6 and the descriptions in the paragraphs corresponding to FIG. 6. The computing unit 210 in FIG. 1 is configured to perform a determination operation on the merged reference values C corresponding to each of the groups 110 and the reference value B corresponding to the sensors 100 in the group 110, respectively so as to generate a determination of suitability of the measuring points P. Regarding the merged reference value s C, please refer to FIG. 7 and the descriptions in the paragraphs corresponding to FIG. 7.

FIG. 6 is a diagram of the groups 110 illustrated according to an embodiment of the present disclosure; FIG. 7 is a diagram of a merged reference value illustrated according to an embodiment of the present disclosure. It should be noted that, in the embodiment of FIG. 6, each of the groups 110 includes two sensors 100. In another embodiment, each group 110 may also include more sensors 100; for instance, each group 110 may include three sensors 100. As illustrated in FIG. 6, the measuring points P include the first measuring point P1, the second measuring point P2 adjacent to the first measuring point P1, and the third measuring point P3 adjacent to the second measuring point P2. The first sensor 120, the second sensor 130, and the third sensor 140 are located at the first measuring point P1, the second measuring point P2, and the third measuring point P3, respectively. The determination operations include a first determination operation and a second determination operation. The second determination operation will be performed only after the result of the suitability determination by the first determination operation shows "not suitable."

Specifically, the group 110 on which the first determination operation is performed is a first group 111 including the first sensor 120 and the second sensor 130. The reference values B corresponding to sensors in the first group 111 includes the first reference value B1 and the second reference value B2. The first reference value B1 corresponds to the first sensor 120, and the second reference value B2 corresponds to the second sensor 130. The merged reference value C corresponding to sensors in the first group 111 is the first merged reference value C1. The first merged reference value C1 corresponds to the first sensor 120 and the second sensor 130.

When the determination operation performed on the first group 111 is the first determination operation, the computing unit 210 in FIG. 1 is configured to compare the first reference value B1 and the second reference value B2 with the first merged reference value C1, respectively. When both the first reference value B1 and the second reference value B2 are larger than the first merged reference value C1, the computing unit 210 in FIG. 1 determines that one of the measuring points corresponding to the first sensor 120 and the second sensor 130 is not suitable and performs the second determination operation. Take the reference value B in FIG. 5 and the merged reference values C in FIG. 7 for instance. The first reference value B1 is 92%, and the second reference value B2 is 89%; hence, both the first reference value B1 and the second reference value B2 are larger than the first merged reference value C1 (56%); therefore, the computing unit 210 determines that one of the first measuring point P1 and the second measuring point P2 is not suitable.

Specifically, as illustrated in FIG. 6, the group 110 on which the second determination operation is performed is a second group 112 including the second sensor 130 and the third sensor 140. The reference values B corresponding to the sensors in the second group 112 include the second reference value B2 and the third reference value B3. The third reference value B3 corresponds to the third sensor 140. The merged reference values C corresponding to the second group 112 is the second merged reference value C2; the second merged reference value C2 corresponds to the second sensor 130 and the third sensor 140.

When the determination operation performed on the second group 112 is the second determination operation, the computing unit 210 in FIG. 1 compares the second reference value B2 and the third reference value B3 with the second merged reference value C2. When both the second reference value B2 and the third reference value B3 are larger than the second merged reference value C2, the computing unit 210 in FIG. 1 determines that the measuring point corresponding to the second sensor 130 is not suitable. Take the reference values B in FIG. 5 and the merged reference values C in FIG. 7 for instance. The second reference value B2 is 89%, and the third reference value B3 is 95%. Both the second reference value B2 and the third reference value B3 are larger than the second merged reference value C2 (70%). Therefore, the computing unit 210 determines that the second measuring point P2 is not suitable. FIG. 8 is a diagram of tagged sensing data illustrated according to an embodiment of the present disclosure. In a preferred embodiment, preprocessing the original data includes tagging. The processed sensing data is the tagged sensing data. Take the original sensing data in FIG. 3 and the tagged sensing data in FIG. 8 for instance. The first sensor 110 is attached to the first measuring point P1. The original sensing data obtained by the measurement at the first measuring point P1 includes "P1:T (25, 28, 27 . . . 24); H (70, 65, 63 . . . 68); V (80, 78, 81 . . . 75)", and the tagged sensing data obtained through measurement at the first measuring point P1 after preprocessing (tagging) the data includes "P1:T (25, 28, 27 . . . 24, IP); H (70, 65, 63 . . . 68, IP); V (80, 78, 81 . . . 75, IP)", wherein "IF" is a tag Tag.

Specifically, tagging includes placing a plurality of tags Tag. Tags include looseness of screws, insufficient power, maximum speed, lowest speed, equipment abnormality, yield rate, other identifiable variation factors, or a combination thereof. The tags Tag correspond to a plurality of predetermined scenarios, respectively, for instance: the predetermined scenario corresponding to the tag Tag of "LS" is "looseness of screws"; the predetermined scenario corresponding to the tag Tag of "IP" is "insufficient power", and so on.

In a preferred embodiment, the computing unit 210 in FIG. 1 is configured to perform a determination operation in accordance with each of the predetermined scenarios. For example, a determination operation is performed for the predetermined scenario of "looseness of screws" to obtain a result of suitability determination; a determination operation is performed for the predetermined scenario of "insufficient power" to obtain a result of suitability determination (and so on). Specifically, after generating the original sensing data, a test is performed on each round of the predetermined scenario (for instance: "looseness of screws") and a tag Tag (for instance: "LS") is added to the original sensing data to turn it into tagged sensing data.

In a preferred embodiment, the computing unit 210 in FIG. 1 is configured to perform the determination operation in accordance with different types of original data; that is, a determination operation is performed on the temperature data so as to obtain a result of suitability determination, a determination operation is performed on the vibration data so as to obtain a result of suitability determination, a determination operation is performed on the humidity data so as to obtain a result of suitability determination . . . (and so on).

Specifically, the computing unit 210 in FIG. 1 is configured to perform the determination operation in accordance with different types of original data of different scenarios. For example, a determination operation is performed on the temperature data with the predetermined scenario of "looseness of screws"; a determination operation is performed on the humidity data with the predetermined scenario of "looseness of screws"; a determination operation is performed on the vibration data with the predetermined scenario of "looseness of screws"; a determination operation is performed on the temperature data of the predetermined scenario of "insufficient power"; a determination operation is performed on the humidity data with the predetermined scenario of "insufficient power"; a determination operation is performed on the vibration data with the predetermined scenario of "insufficient power" . . . (and so on). After obtaining results of suitability determination for each type of original data with each predetermination operation on each of the measuring points P, customized determination processes are further performed in accordance with different design demands to obtain an unsuitable measuring point P. Remove the unsuitable measuring point P and replace it with new measuring point P. The aforementioned processes are performed repeatedly until the most suitable measuring point P is found.

Figure 9:
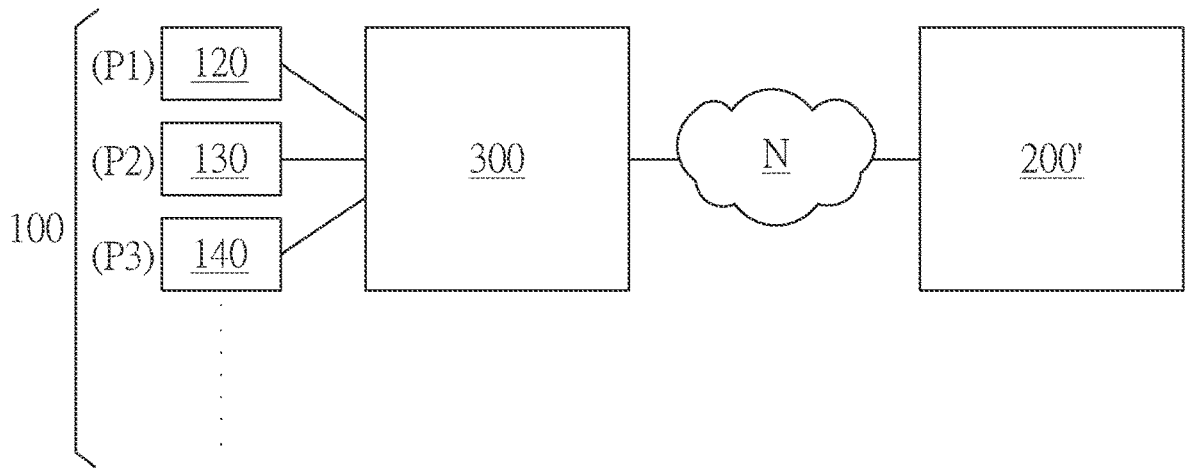
FIG. 9 is a diagram of a multi-point measurement system illustrated according to another embodiment of the present disclosure.

FIG. 9 is a diagram of the multi-point measurement system illustrated according to another embodiment of the present disclosure. FIG. 9 is different from FIG. 1 in that the computing device 200 in FIG. 1 is a computing device located within the communication range of the sensors 100 such as a mobile device or a host computer of the local network. The computing device 200 in FIG. 1 establishes a communication connection to the sensors 100 by near-field communication (NFC). In a preferred embodiment, the computing device 200 establishes a communication connection to the sensors 100 by Bluetooth communication.

FIG. 9 is different from FIG. 1 in that the computing device 200' in FIG. 9 is a cloud computer. As such, the computing device 200' in FIG. 9 needs to establish a communication connection with the sensors 100 via a mediation device 300. Specifically, the mediation device 300 is located within the communication range of the sensors 100 and establishes a communication connection to the sensors 100 by NFC. Then, the mediation device 300 and the computing device 200' communicate with each other via the Internet N. In a preferred embodiment, the mediation device 300 establishes a communication connection to the sensors 100 by Bluetooth communication. In a preferred embodiment, the mediation device 300 is a mobile device or a host computer of the local network.

Figure 10:
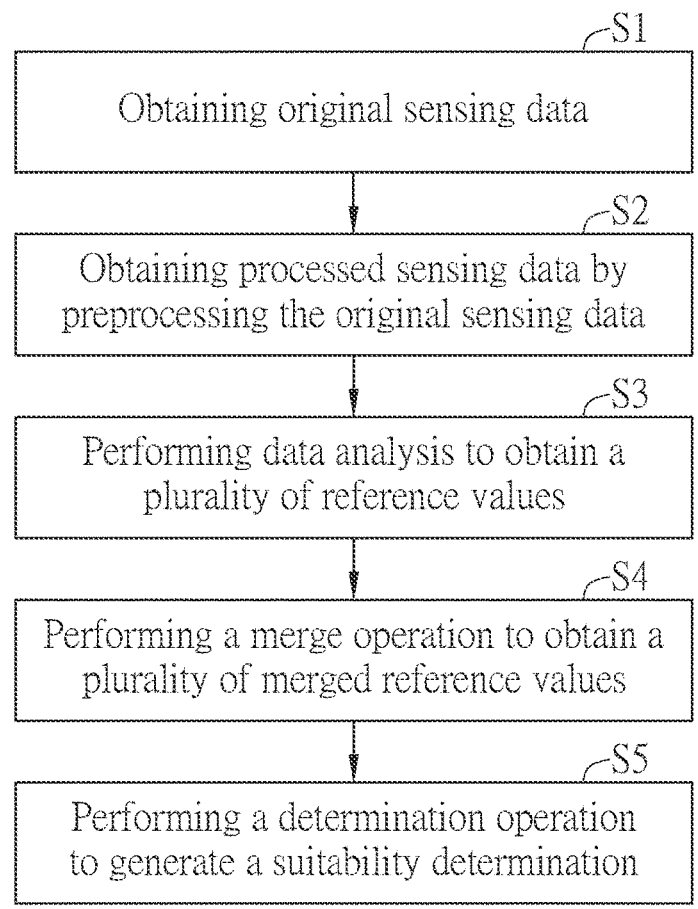
FIG. 10 is a diagram of a multi-point measurement method according to another embodiment of the present disclosure.

FIG. 10 is a diagram of a multi-point measurement method according to another embodiment of the present disclosure. As illustrated in FIG. 10, the multi-point measurement method includes the following steps: (S1) using the plurality of sensors 100 (the first sensor 120, the second sensor 130, the third sensor 140 . . . ) respectively attached to the plurality of measuring points P of the device 20 under testing to obtain a plurality of original sensing data and transmit the original sensing data to the storage unit 220 of the computing device 200 for storage, wherein the computing device 200 respectively establishes communication connections to the sensors 100; (S2) obtaining a plurality of processed sensing data by preprocessing the original sensing data; (S3) using the computing unit 210 of the computing device 200 to input the processed sensing data into the learning module 215 of the computing unit 210 for data analysis and obtain a plurality of reference values corresponding to the sensors 100 (the first sensor 120, the second sensor 130, the third sensor 140 . . . ), respectively; (S4) using the plurality of sensors 100 to form a plurality of groups 110, wherein each group 110 includes at least two adjacent sensors 100; using the computing unit 210 to input the processed sensing data corresponding to the sensors 100 in the group 110 into the learning module 215 for a merge operation and obtain a plurality of merged reference values corresponding to the groups 110; and (S5) using the computing unit 210 to perform a determination operation on the merged reference value corresponding to each group 110 and the reference value corresponding to the sensors 100 in the group 110 so as to generate a suitability determination for the measuring points P. FIG. 10 illustrates a method corresponding to FIGS. 1~9; hence, please refer to the paragraphs related to FIG. 1~9 and the details are not described here.

The first determination operation includes the following steps: using the computing unit 210 to compare the first reference value and the second reference value respectively with the first merged reference value; if both the first reference value and the second reference value are larger than the first merged reference value, using the computing unit 210 to determine that the measuring point P corresponding to one of the first sensor and the second sensor (that is, the first measuring point and the second measuring point) is not suitable and perform the second determination operation.

The second determination operation includes the following steps: using the computing unit 210 to compare the second reference value and the third reference value respectively with the second merged reference value; if both the second reference value and the third reference value are larger than the second merged reference value, using the computing unit 210 to determine that the measuring point P corresponding to the second sensor is not suitable.

The present invention has been described with reference to the above embodiments, but the above embodiments are merely examples for implementing the present invention. It should be noted that the disclosed embodiments are not intended to limit the scope of the present invention. On the contrary, any modification and equivalent configuration within the spirit and scope of the appended claims shall fall within the scope of the present invention.

What is claimed is:

1. A multi-point measurement system for measuring a device under test, comprising:
    a plurality of sensors respectively attached to a plurality of measuring points of the device under test; and
    a computing device including a computing unit and a storage unit, the computing unit including a learning module, the computing device establishing communication connections to the sensors, respectively,
    wherein the sensors are configured to generate a plurality of original sensing data and transmit the plurality of original sensing data to the storage unit for storage;
    wherein the computing unit is configured to input processed sensing data obtained by preprocessing the original sensing data to the learning module for data analysis, and is configured to obtain a plurality of reference values corresponding to the sensors, respectively;
    wherein the plurality of sensors form a plurality of groups; each group includes at least two adjacent sensors; for each group, the computing unit is configured to input the processed sensing data corresponding to the sensors in the group to the learning module for merge operation, and is configured to obtain a plurality of merged reference values corresponding to the groups, respectively;
    wherein the computing unit is configured to perform a determination operation through comparing the merged reference value corresponding to each group and the reference values corresponding to the sensors in the group so as to generate a suitability determination for the measuring points;
    wherein the measuring points include a first measuring point and a second measuring point adjacent to each other;
    the plurality of groups includes a first group including a first sensor and a second sensor of the plurality of sensors, the first sensor is located at the first measuring point, and the second sensor is located at the second measuring point;
    the reference values corresponding to the sensors in the first group include a first reference value and a second reference value, the first reference value corresponds to the first sensor, and the second reference value corresponds to the second sensor;
    the merged reference value corresponding to the first group is a first merged reference value, the first merged reference value corresponds to the first sensor and the second sensor; and
    the determination operation performed on the first group is a first determination operation, the first determination operation includes:
    the computing unit compares each of the first reference value and the second reference value to the first merged reference value: and
    when both the first reference value and the second reference value are larger than the first merged reference value, the computing unit determines that one of the first measuring point and the second measuring point is unsuitable, wherein the unsuitable measuring point is removed and the computing unit performs a second determination operation.

2. The multi-point measurement system of claim 1, wherein:
    the measuring points further include a third measuring point adjacent to the second measuring point;
    the plurality of groups includes a second group including the second sensor and a third sensor of the plurality of sensors, the third sensor is located at the third measuring point;
    the reference values corresponding to the sensors in the second group include the second reference value and a third reference value, the third reference value corresponds to the third sensor;
    the merged reference value corresponding to the second group is a second merged reference value, the second merged reference value corresponds to the second sensor and the third sensor; and
    the determination operation performed on the second group is the second determination operation; the second determination operation includes:
    the computing unit compares each of the second reference value and the third reference value to the second merged reference value; and
    when both the second reference value and the third reference value are larger than the second merged reference value, the computing unit determines that the second measuring point is not suitable.

3. The multi-point measurement system of claim 1, wherein:
    each of the plurality of original sensing data includes a plurality of original time sequence sensing data; and the plurality of time sequence sensing data corresponds to a plurality of time windows, respectively.

4. The multi-point measurement system of claim 3, wherein:
the device under test has an operation period; and
a time unit of the time windows ranges from 1 to 10 times of the operation period.

5. The multi-point measurement system of claim 1, wherein:
preprocessing the original sensing data includes tagging; and
the plurality of processed sensing data is a plurality of tagged sensing data.

6. The multi-point measurement system of claim 5, wherein:
the tagging includes setting a plurality of tags; and
the plurality of tags includes looseness of screws, insufficient power, maximum speed, lowest speed, equipment abnormality, yield rate, other identifiable variation factors or a combination thereof.

7. The multi-point measurement system of claim 6, wherein:
the plurality of tags corresponds to a plurality of predetermined scenarios; and
the computing unit is configured to perform the determination operation in accordance with each of the predetermined scenarios.

8. The multi-point measurement system of claim 1, wherein:
the sensors are temperature sensors, humidity sensors, vibration sensors or a combination thereof; and
the original sensing data are temperature data, humidity data, vibration data or a combination thereof.

9. The multi-point measurement system of claim 8, wherein:
the computing unit is configured to perform the determination operation in accordance with each of the original sensing data.

10. A multi-point measurement method for measuring a device under test, comprising steps of:
by using a plurality of sensors respectively attached to a plurality of measuring points of the device under test, obtaining a plurality of original sensing data and transmitting the plurality of original sensing data to a storage unit of a computing device for storage, the computing device respectively establishing communication connections to the plurality of sensors;
by using a computing unit of the computing device, inputting a plurality of processed sensing data obtained by preprocessing the original sensing data to a learning module of the computing device for data analysis, and obtaining a plurality of reference values respectively corresponding to the sensors;
the plurality of sensors forming a plurality of groups, each group including at least two adjacent sensors, by using the computing unit, for each group, inputting the processed sensing data corresponding to the sensors in the group to the learning module for merge operation, and obtaining a plurality of merged reference values corresponding to the groups, respectively; and
performing a determination operation through comparing the merged reference value corresponding to each group and the reference values corresponding to the sensors in the group by using the computing unit so as to generate a suitability determination for the measuring points;

the groups include a first group, the determination operation performed on the first group is a first determination operation, the first group includes a first sensor and a second sensor of the plurality of sensors, the reference values include a first reference value corresponding to the first sensor and a second reference value corresponding to the second sensor, the merged reference value corresponding to the first group is a first merged reference value, the first determination operation includes:
comparing each of the first reference value and the second reference value to the first merged reference value by using the computing unit; and
determining that both the first reference value and the second reference value are larger than the first merged reference value, determining that one of the measuring points which the first sensor and the second sensor correspond to is unsuitable, by using the computing unit, wherein the unsuitable measuring point is removed and performing a second determination operation; wherein:
the measuring points include a first measuring point and a second measuring point adjacent to each other;
the first sensor is located at the first measuring point, the second sensor is located at the second measuring point; and the first merged reference value corresponds to the first sensor and the second sensor.

11. The multi-point measurement method of claim 10, wherein the groups include a second group formed by the second sensor and a third sensor of the plurality of sensors, the determination operation performed in the second group is the second determination operation, the reference values further include a third reference value corresponding to the third sensor, the merged reference value corresponding to the second group is a second merged reference value; the second determination operation includes:
comparing each of the second reference value and the third reference value to the second merged reference value by using the computing unit; and
determining that both the second reference value and the third reference value are larger than the second merged reference value, determining that the second measuring point is not suitable by using the computing unit; wherein:
the measuring points further include a third measuring point adjacent to the second measuring point;
the third sensor is located at the third measuring point; and
the second merged reference value corresponds to the second sensor and the third sensor.

12. The multi-point measurement method of claim 10, wherein:
each of the plurality of original sensing data includes a plurality of original time sequence sensing data; and
the plurality of time sequence sensing data corresponds to a plurality of time windows, respectively.

13. The multi-point measurement method of claim 12, wherein:
the device under test has an operation period; and
a time unit of the time windows ranges from 1 to 10 times of the operation period.

14. The multi-point measurement method of claim 10, wherein:
preprocessing the original sensing data includes tagging; and
the plurality of processed sensing data are a plurality of tagged sensing data.

15. The multi-point measurement method of claim 14, wherein:
the tagging includes setting a plurality of tags; and
the plurality of tags includes looseness of screws, insufficient power, maximum speed, lowest speed, equipment abnormality, yield rate, other identifiable variation factors or a combination thereof.

16. The multi-point measurement method of claim 15, further comprising:
by using the computing unit, performing the determination operation in accordance with each of predetermined scenarios, the plurality of tags corresponding to the predetermined scenarios.

17. The multi-point measurement method of claim 10, wherein:
the sensors are temperature sensors, humidity sensors, vibration sensors or a combination thereof; and
the original sensing data are temperature data, humidity data, vibration data or a combination thereof.

18. The multi-point measurement method of claim 17, wherein:
the computing unit performs the determination operation in accordance with each of the original sensing data.

* * * * *